United States Patent Office 3,459,824
Patented Aug. 5, 1969

3,459,824
REMOVAL OF CONTAMINANTS FROM UN-
SATURATED HYDROCARBON-CONTAIN-
ING MIXTURES
William T. Nelson and Marvin M. Johnson, Bartlesville, Okla., assignors to Phillips Petroleum Company, a corporation of Delaware
No Drawing. Filed Mar. 4, 1968, Ser. No. 709,949
Int. Cl. C07c 7/02, 11/00
U.S. Cl. 260—681.5                                                6 Claims

ABSTRACT OF THE DISCLOSURE

Allenic and acetylenic compounds are removed from conjugated diene mixtures containing same by hydration in vapor phase at 600–850° F. with a copper phosphate-zinc oxide catalyst.

BACKGROUND OF THE INVENTION

This invention relates to the purification of unsaturated hydrocarbon-containing mixtures to remove undesirable contaminants therefrom. In accordance with one aspect, this invention relates to a method of removing unsaturates such as 1,2-dienes and 1-acetylenes from conjugated diene mixtures containing same by contacting the mixture at an elevated temperature with a copper phosphate-zinc oxide catalyst. In accordance with a further aspect, this invention relates to a process for the purification of the effluent from an oxidative dehydrogenation process by hydrating the effluent with a copper phosphate-zinc oxide catalyst to remove 1,2-polyenes and acetylenic compounds therefrom.

The present process provides a method whereby 1,2-dienes such as allene, and 1,2-butadiene and 1-acetylenes, such as vinylacetylene, methyl-acetylene, 1-butyne, and the like, can be removed from conjugated diene mixtures containing them without the necessity for hydrogenation and extensive fractionation. There is thus provided a means whereby substantial reduction and plant investment and utility is realized.

The use of copper oxide or zinc oxide or phosphoric acid-containing catalyst for hydration of acetylenes in a butadiene stream is disclosed in U.S. Patent No. 2,408,970. Also, the use of a copper pyrophosphate-charcoal catalyst for hydration of acetylenes in an olefin-hydrocarbon stream is disclosed in U.S. Patent No. 2,564,278.

In accordance with the invention, we have found that a copper phosphate-zinc oxide catalyst is quite active for the hydration of acetylenes and related compounds in a conjugated diene-containing stream and is selective, destroying very little conjugated diene.

Accordingly, an object of this invention is to provide a simplified process for removing contaminants from unsaturated hydrocarbon-containing mixtures, such as conjugated diene streams.

Another object of this invention is to provide an improved process for removing 1,2-dienes and 1-acetylenes from conjugated diene-containing mixtures to provide a highly purified conjugated diene-containing stream.

A further object of this invention is to provide a process for purifying conjugated diene-streams obtained from oxidative dehydrogenation processes, whereby 1,2-polyene and acetylenic compound contaminants are removed therefrom.

A further object of this invention is to provide a process for purifying conjugated diene streams containing 1,2-dienes and 1-acetylenes to convert the latter materials at least in part to alcohols and aldehydes which are readily separable from the conjugated diene.

Other and further objects and advantages of this invention will become apparent to those skilled in the art upon consideration of the accompanying disclosure and appended claims.

SUMMARY OF THE INVENTION

In accordance with the invention, a process for separating 1,2-polyenes and acetylenic compounds from the conjugated diene mixture containing same is provided which comprises hydrating said mixture with a copper phosphate-zinc oxide catalyst at an elevated temperature sufficient to remove a substantial portion of said 1,2-polyenes and 1-acetylenes present in said mixture by converting the 1,2-polyenes and 1-acetylenes at least in part to alcohols and aldehydes which are readily separable from conjugated dienes.

Further, in accordance with the invention, it has been found that a copper phosphate-zinc oxide catalyst containing 0.5–10 weight percent copper phosphate is quite active for the hydration of acetylenes and related compounds, such as 1,2-butadiene, allene, and the like, in a butadiene-containing stream and is selective, destroying very little butadiene.

Further in accordance with the invention, it has been found that the effluent from an oxidative dehydrogenation process containing 1,2-dienes, 1-acetylenes, oxygen, steam and other materials, as well as conjugated dienes, such as butadiene, can be purified of the contaminants by contacting the effluent, preferably without intermediate separation, with a copper phosphate-zinc oxide catalyst of the invention.

DESCRIPTION OF THE PREFERRED EMBODIMENTS

The catalysts of this invention can be prepared in any manner known to the industry, such as by mechanically mixing the zinc oxide and copper phosphate, optionally freshly prepared—in which case the zinc oxide would usually be present as the hydroxide and the copper phosphate would be hydrated; by precipitating one material in the presence of the already-formed other material, such as by addition of ammonia to an aqueous solution of zinc nitrate in the presence of copper phosphate or by addition of phosphoric acid to an aqueous solution of copper nitrate in the presence of zinc oxide; and the like.

It is within the scope of the invention to reduce the olefin isomerization activity of the catalyst by treating with an alkali metal or alkaline earth metal compound such as lithium hydroxide, sodium hydroxide, barium acetate, and the like, such that the finished catalyst contains 0.1 to 5 weight percent alkali metal or alkaline earth metal.

The catalyst can be used in the form of granules, pellets, extrudate, and the like in a fixed bed or in the form of a finely divided powder in a fluidized bed.

In actual operation, hydration of the 1,2-dienes and 1-acetylenes converts a substantial portion of these materials to alcohols and aldehydes. The alcohols and aldehydes can be separated from conjugated dienes by distillation, extractive distillation, adsorption, and the like, the particular recovery process employed depending upon economics. The alcohols and aldehydes produced by hydration, as well as unconverted 1,2-dienes and 1-acetylenes, should be removed from conjugated dienes prior to further use, since these materials are known catalyst poisons.

In the oxidative dehydrogenation of steam-diluted olefins to the corresponding conjugated diolefins, such as by the process of U.S. Patent No. 3,320,329 using tin/phosphorus/oxygen catalysts, the product contains undesirable acetylenes and non-conjugated diolefins. Such contaminants preclude the use of the product directly in processes utilizing the conjugated diolefin as feedstock. We have found that if the total product of the dehydrogenation reaction is fed to a reactor containing the catalyst of our invention, these contaminants can be reduced to such a level that the product can be utilized directly in processes such as polymerization, chemical synthesis, and the like. Preferred operating conditions for oxidative dehydrogenation of steam-diluted monoolefins, such as those containing 3 to 10 carbon atoms, with the aforementioned tin-containing catalysts are:

| | |
|---|---|
| Temperature, °F. | 700–1300 |
| Pressure, p.s.i.a. | 0.05–250 |
| Feed space velocity, v./v./hr.[a] | 50–5000 |
| $O_2$/feed ratio, mol | 0.1/1 to 3/1 |
| Steam/feed ratio, mol | 0.1/1 to 100/1 |

[a] Volumes of vapor per volume of catalyst per hour at 32° F. and 14.7 p.s.i.a.

The products of dehydrogenation are fed directly to a reactor containing a catalyst of our invention under conditions that are essentially the same as those listed for the dehydrogenation except that the temperature is in the range of 600 to 850° F., preferably 700 to 750° F. Better removal of the contaminants is obtained at the higher temperatures, but there is a concomitantly higher loss of the desired conjugated diolefin. There is only a small change in volume during the dehydrogenation process, so that the total flow in the hydration reactor is usually only slightly different from that in the dehydrogenation reactor. It is within the scope of the invention to add additional steam and/or oxygen-containing gas between the two reactors. The process of our invention has the added advantage that it operates on the same cycle as the dehydrogenation process. That process operates for long periods of time, but when regeneration is necessary it can be effected simply by discontinuing hydrocarbon flow for a short period. The hydration catalyst is maintained in a regenerated condition by the small amount of residual oxygen in the dehydrogenation effluent and/or by the regeneration effected during the regeneration of the dehydrogenation catalyst. Any source of oxygen can be used, such as air, flue gas containing residual oxygen, and the like.

In summary, the operating conditions for hydration of the undesirable 1,2-polyenes and acetylenes in a conjugated diene stream with the catalysts of the invention are:

| | |
|---|---|
| Temperature, °F. | 600–850 |
| Pressure, p.s.i.a. | 0.05–250 |
| Feed space velocity, v./v./hr.[a] | 50–5000 |
| $O_2$/feed ratio mol [b] | 0/1 to 3/1 |
| Steam/feed ratio, mol | 0.1/1 to 100/1 |

[a] Volumes of vapor (excluding oxygen, nitrogen, and/or steam) per volume of catalyst per hour at 32° F. and 14.7 p.s.i.a.
[b] Oxygen can be absent, but is preferably present in an $O_2$/feed mol ratio of at least 0.1/1.

The catalyst used to demonstrate the process of the invention in the following examples was prepared by ball-milling a mixture of 4 parts by weight $Cu_3(PO_4)_2 \cdot 3H_2O$ and 96 parts by weight of a commercial zinc oxide for about 6 hours, adding sufficient water to the ball-milled mixture to form a thick paste, extruding through a 3/16 inch die, and drying the chopped extrudate for about 6 hours at 230° F. The commercial zinc oxide used in the preparation of the catalyst had the following composition (dry basis):

| | Weight percent |
|---|---|
| ZnO | 82.4 |
| $SiO_2$ | 11.0 |
| $Al_2O_3$ | 6.3 |
| CaO | 0.3 |

Any available zinc oxide that contains 60 weight percent or more ZnO can be used in the catalysts of the invention.

EXAMPLE I

The hydrocarbon portion of an effluent from the oxidative dehydrogenation of butene-2 having the indicated composition was mixed with steam and passed over the catalyst of the invention at 710° F., atmospheric pressure, and the indicated space velocities to give a product having the indicated composition:

Feed space velocity, v./v./hr.:
  Hydrocarbon _____ 390
  Steam _____ 274

Analysis of hydrocarbon stream, weight percent or p.p.m.:

| | Feed | Product |
|---|---|---|
| Wt. percent: | | |
| Light gases | 0.00 | 0.21 |
| $C_3$'s | 0.09 | 0.08 |
| n-Butane | 0.81 | 0.60 |
| Butene-1 | 0.10 | 1.48 |
| t-Butene-2 | 21.20 | 21.13 |
| c-Butene-2 | 24.65 | 25.10 |
| 1,3-butadiene | 52.86 | 51.39 |
| P.p.m.: | | |
| 1,2-butadiene | 100 | <10 |
| Butyne-1 | 330 | <5 |
| Vinylacetylene | 1,200 | <5 |
| Allene (propadiene) | 600 | 10 |
| Methylacetylene | 700 | 80 |

It is apparent that there is a considerable reduction of acetylenes and related products, and that there was very little destruction of butenes or butadiene.

EXAMPLE II

A different hydrocarbon portion of an effluent from the oxidative dehydrogenation of butene-2 having the indicated composition was mixed with steam and passed over the catalyst of the invention with and without added simulated dry flue gas at 710–717° F., atmospheric pressure, and the indicated space velocities to give products having the indicated compositions:

| Feed space velocity, v./v./hr.: | A | B |
|---|---|---|
| Hydrocarbon | 370 | 370 |
| Steam | 620 | 620 |
| Flue gas [1] | 0 | 370 |

[1] 92 mol percent $N_2$, 6.5% $CO_2$, 1.5% $O_2$.

Analysis of hydrocarbon stream, weight percent or p.p.m.:

| | | A | | B | |
|---|---|---|---|---|---|
| Time in run, min | Feed | 5 | 60 | 5 | 60 |
| Wt. percent: | | | | | |
| Light gases | 2.02 | 1.20 | 2.80 | | |
| Butenes | 28.36 | 30.12 | 28.92 | Not calculated | |
| 1,3-butadiene | 67.40 | 67.55 | 66.64 | | |
| P.p.m.: | | | | | |
| 1,2-butadiene | 500 | 14 | 125 | <10 | 65 |
| Butyne-1 | 130 | 0 | 33 | <5 | 20 |
| Butyne-2 | 940 | 100 | 460 | 160 | 360 |
| Vinylacetylene | 1,140 | <10 | 155 | <10 | <10 |

It is apparent that the presence of oxygen results in maintaining catalyst activity for a longer period.

EXAMPLE III

A hydration reactor containing the catalyst of the invention was coupled directly to an oxidative dehydrogenation reactor containing a tin/phosphorus/oxygen catalyst of the aforementioned patent; operating conditions in these reactors were:

| | Dehydrogenation | Hydration |
|---|---|---|
| Space velocity, v./v./hr.: | | |
| Butene-2 | 300 | |
| Air | 900 | [1] 5,420 |
| Steam | 6,000 | |
| Temperature, °F | 1,075 | 622–831 |
| Pressure, p.s.i.a. | 29.4 | 29.4 |

[1] Mixture of reaction products, unreacted olefin, nitrogen, residual oxygen, and steam.

The process cycle was 60 minutes on stream and 30 minutes on regeneration, during which butene-2 flow was discontinued.

The results obtained at various hydration reactor temperatures are:

| Average reactor temp., °F.[1] | Total α Acetylenes, p.p.m.[2] | Butene conversion, percent | | Butadiene selectivity, mol percent | |
|---|---|---|---|---|---|
| | | Before | After | Before | After |
| 831 | <23 | 57.3 | 61.7 | 94.4 | 85.9 |
| 818 | 19 | 53.9 | 64.0 | 94.8 | 86.9 |
| 756 | 32 | 64.9 | 65.4 | 93.1 | 90.7 |
| 732 | 69 | 64.9 | 63.9 | 93.1 | 90.8 |
| 716 | 432 | 60.8 | 63.4 | 92.9 | 90.1 |
| 700 | 341 | 61.2 | 64.4 | 91.0 | 90.2 |
| 696 | 574 | 62.7 | 62.6 | 92.4 | 88.7 |
| 723 | 243 | 61.5 | 66.1 | 91.5 | 89.9 |
| 724 | 215 | | | | |
| 658 | 621 | | | | |
| 654 | 1,061 | | | | |
| 751 | 309 | | | | |
| 748 | 189 | 66.4 | 66.4 | 91.5 | 89.6 |
| 630 | 678 | 64.2 | 65.6 | 91.6 | 91.3 |
| 622 | 1,276 | 65.8 | 64.4 | 91.4 | 91.0 |

[1] For 12-hour period preceding time of sampling.
[2] Determined by AgNO₃ titration; expressed as p.p.m. of vinyl acetylene. Spot checks showed the reactor feed to contain about 2,800 p.p.m. of α acetylenes, expressed as p.p.m. of vinyl acetylene.

NOTE.—"Before" and "after" refer to results calculated from analyses made before and after the hydration reactor, i.e., to conversion and selectivity values determined on the dehydrogenation reactor effluent and the hydration reactor effluent, respectively.

These data show that α-acetylenes are removed throughout the temperature range tested, that butadiene selectivity suffers at the higher temperature, and that an optimum temperature at which α-acetylenes removal and butadiene selectivity are both high is in the range of 730 to 750° F.

All analyses were by gas-phase chromatography (GPC); thus the selectivity is a "gas-phase" value—i.e., the small amount of liquid product is neglected. Results in Examples I and II were calculated from the area under the GPC curves and are expressed as weight percent; those in Example III were calculated from the peaks in the GPC curves using calibration curves and are expressed as mol percent.

In all the tests made essentially all of the oxy-compounds formed by the hydration reaction remained with the water phase that was condensed and separated from the hydration reactor effluent.

We claim:
1. A process for removing 1.2-polyenes and acetylenic compounds from a conjugated diene mixture containing same which comprises hydrating said mixture by contacting with copper phosphate-zinc oxide catalyst containing 0.5–10 weight percent copper phosphate at an elevated temperature sufficient to remove a substantial portion of said polyenes and 1-acetylenic compounds present in said mixture.

2. A process according to claim 1 wherein said contacting is effected at a temperature in the range of 600–850° F.

3. A process according to claim 1 wherein the mixture comprises butadiene.

4. A process according to claim 1 wherein the polyenes and acetylenes are 1,2-dienes and 1-acetylenes and said contacting is effected at a temperature in the range of 600–850° F.

5. A process according to claim 1 wherein said contacting is effected in the presence of steam and oxygen at a temperature in the range of 600–850° F.

6. A process according to claim 1 wherein said conjugated diene mixture is a butadiene mixture obtained as the effluent from the oxidative dehydrogenation of olefins and the effluent contains oxygen, steam, 1,2-dienes, and 1-acetylenes, as well as butadiene and the contacting is effected at a temperature within the range 600–850° F.

References Cited
UNITED STATES PATENTS

| 2,408,970 | 10/1946 | Doumani et al. | 260—681.5 |
| 2,569,092 | 9/1951 | Deering | 260—605 |
| 2,564,278 | 8/1951 | Ray | 260—605 |

DELBERT E. GANTZ, Primary Examiner

G. E. SCHMITKONS, Assistant Examiner

U.S. Cl. X.R.

203—31; 260—605